United States Patent Office 3,470,113
Patented Sept. 30, 1969

3,470,113
PROCESS FOR THE PRODUCTION OF POLYOLE-
FINES CONTAINING BLOWING AGENTS
Fritz Baxmann, Wolfgang Bursian, and Rudolf Schu-
macher, Marl, Germany, assignors to Chemische Werke
Huls Aktiengesellschaft, Marl, Germany, a corporation
of Germany
No Drawing. Filed Aug. 3, 1964, Ser. No. 387,224
Claims priority, application Germany, Feb. 1, 1964,
C 32,024
Int. Cl. C08f 47/10, 47/02
U.S. Cl. 260—2.5                                  4 Claims

ABSTRACT OF THE DISCLOSURE

In preparing a mixture of polyolefine and a blowing agent, for use in an extrusion (or, injection) molding machine, a polyolefine powder, up to 80% by weight of the particles of which are less than 150 microns, is mixed with a solid blowing agent in fine powder form and the mixture is simultaneously stirred and heated to its sintering temperature and then is cooled, whereby there is produced a foamable granular substance having desirable free-flowing characteristics making the substance immediately usable in the molding machine.

---

Foam bodies of polyolefines advantageoulsy are prepared from mixtures of polyolefines and blowing agents by means of extrusion or injection molding machines. One may incorporate a blowing agent into a low pressure polyolefine in powdered form by mixing the blowing agent also in powdered form. However the resulting non-flowable powder mixtures are not adapted to be handled in the customary molding machines but require the use of expensive twin screw extruders. Consequently attempts have been made to produce flowable, blowing agent-containing polyolefines by mixing about 0.3 to 0.5 part by weight of a wetting agent such as mineral oil and a solid blowing agent in powder form with 100 parts by weight of a granulate of uniform grain size produced by an extruder. The disadvantage of this process is that one must operate in two stages and due to the imperfect distribution of the fine particles of the blowing agent on the surfaces of the relatively large granules of the polyolefine a uniform cell structure in the foam is not obtained. Moreover only a limited amount, up to about 1% of the blowing agent can be sufficiently firmly adhered to the granules since greater proportions tend to separate.

One cannot simply distribute the blowing agent in the molten polyolefine because the blowing agent must be decomposable at the softening temperature of the polyolefine which is below its melting temperature.

There is a need for a simple process by means of which adequate amounts of blowing agents can be incorporated, in a single stage operation, into low pressure polyolefine powders during the granulation thereof to a flowable grain size without decomposition, and to the production of homogeneous mixtures that do not separate.

It has now been found that polyolefines containing blowing agents can be made by mixing finely divided polyolefine powder, up to 80% by weight of which has a particle size below 150µ, with 0.1–5.0% by weight of a solid blowing agent in powdered form and if desired also heat stabilizers, accelerators, coloring and filler material or cross-linking agents in a mixer which may be heated up to the sintering temperature of the mixture.

The polyolefine powder used in the process may be suitably pulverized or a powder of a polymer or copolymer made by low pressure polymerization from ethylene, propylene, butene-1 and mixtures thereof. The polyolefine powder should not contain more than 85% by weight, preferably 80% by weight, of a grain size below 15µ. The following grain size distributions are especially suitable.

| Polyethylene: | Percent |
|---|---|
| <40µ | 10 |
| 40–120µ | 60 |
| 120–150µ | 10 |
| >150µ | 20 |

| Polypropylene | |
|---|---|
| <100µ | 50 |
| 100–150µ | 30 |
| 150–200µ | 10 |
| 200–500µ | 5 |
| 500–1000µ | 5 |

| Polybutene-1 | |
|---|---|
| <100µ | 30 |
| 100–150µ | 45 |
| 150–200µ | 10 |
| 200–500µ | 10 |
| 500–1000µ | 5 |

The solid fine powder form blowing agent which is mixed with the polyolefine in an amount within the range from 0.1 to 5% by weight and preferably within the range from 0.3 to 1.5% by weight and particularly 0.5% by weight may be azodicarbonamide available under the trade names Porofor ADC and Genitron AC or diphenyl-oxide-4,4'-disulfohydrazoate available under the trade names Porofor DO 44 and Celogen which decompose and liberate principally nitrogen or an inorganic blowing agent such as a carbonate-acid mixture which liberates carbon dioxide e.g. a mixture of sodium bicarbonate and boric acid in equivalent amounts. The grain or particle size of the blowing agent should be no greater than 50µ.

The mixtures of polyolefine and blowing agent may contain additions such as (a) antioxidants for the polyolefine e.g. 2,6-di-tert.-butyl-p-cresol or 4,4'-methylene-bis(6-tert.-butyl-o-cresol), (b) decomposition accelerators such as zinc oxide which, for example, in the foaming of low pressure polyethylene with azodicarboxylic acid amide as the blowing agent is used in an amount within the range from 20 to 100% by weight based upon the weight of the blowing agent and lowers the decomposition temperature thereof, (c) coloring agents and fillers such as chalk, quartz powder or silica which may be added in an amount up to about 50% and preferably within the range from 5 to 20% by weight based on the polyolefine and serve to cheapen the mixture and to reduce the shrinkage upon cooling with only negligible effect on the properties of the foam product; and (d) radical formers e.g. peroxides such as dicumylperoxide which in amounts within the range from 0.1 to 4%, preferably 0.5 to 2% by weight based on the polyolefine serve to cause a cross linking of the foamed polymer.

The mixtures described above are mixed in known mixing apparatus to the point of sintering. The sintering results from the heating of the polyolefine particles. The necessary heat may be supplied solely by the high shearing force of a high speed mixer on the mixture or it can be supplied in part by heat from an external source.

Suitable mixers are those that have high speed mixing blades and stationary or reversely moving strippers and which create a high shearing force.

The start of the sintering can easily be detected by the sharp increase in the electric current supply to the driving motor. This is the result of the higher frictional resistance of the mixture due to the formation of agglomerates.

A normal charge may be brought to sintering temperature in 30 minutes without external heating and in a correspondingly shorter time with external heating. Care is taken that the granulate formed is not unnecessarily overheated and the product is cooled to room temperature e.g. in a water cooled low speed mixer.

The product obtained as described above is sufficiently free flowing for the production of foamed products by the extrusion process or the injection molding process. In order to increase the easy flow of the product, the fine portion e.g. the portion having a particle size up to $50\mu$ which amounts from 5 to 10% by weight may be separated by sieving. In the same proportions are the coarse portions above $1000\mu$ which also may be separated by sieving. The so separated coarse part can be subdivided and mixed with the separated fine part and the resulting mixture again subjected to the sintering operation.

Automatic cutoff nozzles are recommended for the processing of the granulates of the invention in extrusion and injection molding machines.

It is surprising that the sintering process permits the production of a granulate that is homogeneously impregnated with blowing agent, the process being distinguished by a very short sintering time depending upon the specified particle size of the polyolefine powder, without appreciable loss of gas due to the beginning of the decomposition of the blowing agent.

Example 1

In a mixer having a capacity of 10 l. there were charged 400 g. of polyethylene powder (low-pressure polyethylene according to Ziegler having a reduced viscosity according to ASTM D1238–57T of 20 g./10 min. at 5.00 Kp. load, a reduced specific viscosity of $\eta_{red}=1.25$ and a grain size of 80% $<150\mu$ and 20% $150-250\mu$)
80 g. of azodicarbonamide powder (blowing agent), grain size $\leq 30\mu$
40 g. zinc oxide (decomposition accelerator)
1.2 g. dilauryldithiopropionate (stabilizer)
8 g. calcium stearate (stabilizer).

The mixer was a vertically disposed cylindrical vessel open at the top with a cover of the same size with a stirrer having a vertical shaft mounted thereon. Also mounted on the cover there was a blade concentric to the stirrer shaft which moves in the opposite direction to the stirrer between the range of the stirrer blades and the inner wall of the mixing vessel. The cover and the mixing vessel make a tight closure.

The stirrer was rotated at 1700 revolutions per minute while the blade was rotated in the opposite direction at 120 revolutions per minute.

As a result of the high shearing force applied to the product between the stirrer, the blade and the vessel wall a considerable heating occurred. After about 25–28 minutes the mass had a temperature of 120° C. and after about 30 minutes the temperature reached 125° C. whereupon the sintering was stopped. The beginning of the sintering was indicated by a sharply increasing current consumption by the motor which drives the stirrer.

The mixer was emptied and the product transferred to a water cooled low speed mixer and cooled to room temperature. The product was worked up at a temperature and injection cycle which was customary for polyolefine molding into thick walled molded bodies the foamed core zone of which had a density of about 0.3–0.6 g./cm.³.

Example 2

A mixer with a capacity of 150 l. was charged with 15 kg. of the polyethylene powder of Example 1
30 g. of dilauryldithiopropionate (stabilizer)
75 g. of 2,6-di-tert.-butyl-p-cresol (stabilizer)
180 g. of diphenyloxide-4,4'-disulfohydrazoate, grain size $\leq 50\mu$ (blowing agent).

The mixer consisted of a cylindrical container with a cover. Close to the bottom of the container there was a horizontal rotary disk equipped with stirring blades which was driven by a shaft which extended upwardly through the bottom of the container. The mixer was surrounded by a heating jacket filled with oil. A blade secured to the cover extended down nearly to the rotor and provided a resistance to the movement of the material. The charge was heated by heat supplied by the jacket and also by the heat generated by mixing and quickly reached its sintering temperature. At a jacket temperature of 140° C. the sintering of the polyolefine-blowing agent mixture was completed in 15 minutes and the internal temperature of the mixture was 115–120° C. The product was immediately transferred to two slow speed mixers and cooled therein to room temperature. After sieving out the coarse grains the material was ready for use.

Example 3

15 kg. of polypropylene powder having an $I_5$-value of 13.3 and a reduced specific viscosity $\eta_{red}=2.5$ (80% $<150\mu$ and 20% $150-1000\mu$)
90 g. of azocarbonamide-powder
15 g. of 4,4'-methylene-bis(6.tert.-butyl-o-cresol)
15 g. of dilauryldithiopropionate was sintered in a heated mixer as described in Example 2. The sintering was completed in 26 minutes. By holding the jacket temperature constant at 155° C. the mixture, at the end of the sintering, had a temperature of 140° C. The amount of material having a grain size greater than $1000\mu$ was about 20% by weight.

Example 4

17 kg. of ethylene-butene-1 mixed polymer, in powder form (reduced viscosity $I_5=0.84$; reduced specific viscosity $\eta_{red}=2.2$)
85 g. of azodicarbonamide powder
50 g. of zinc oxide
85 g. of 2,6-di-tert.-butyl-p-cresol
8.5 g. of dilauryldithiopropionate were sintered in a heated mixer as described in Example 2. At a constant jacket temperature of 140° C. the sintering was completed in 25 minutes and the sintered product was at a temperature of 100° C.

The grain size before and after sintering is shown in the following table.

| Grain size ($\mu$) | Before sintering, percent | After sintering, percent |
|---|---|---|
| <50 | 43 | 12.7 |
| 50–100 | 26.4 | 8.8 |
| 100–150 | 10.4 | 6.3 |
| 150–300 | 13.6 | 14.4 |
| 300–500 | 5.8 | 24.3 |
| 500–1,000 | 0.8 | 43.5 |

Example 5

15 kg. of poly-butene-1 powder ($I_5$ value=0.72, reduced specific viscosity $\eta_{red}=4.5$)
150 g. of azodicarbonamide powder
15 g. of 4,4'-methylene-bis(6-tert.-butyl-o-cresol)
75 g. of 2,6-di-tert.-butyl-p-cresol was sintered in a heated mixer as described in Example 2 at a jacket temperature of 145° C. The sintering time was 28 minutes and the end temperature of the sintered product was 132° C.

The grain sizes before and after sintering are given in the following table.

| Grain size ($\mu$) | Before sintering, percent | After sintering, percent |
|---|---|---|
| <50 | 49.3 | |
| 50–100 | 11.5 | |
| 100–150 | 19.5 | 3.3 |
| 150–300 | 6.0 | 8.7 |
| 300–500 | 7.9 | 12.4 |
| 500–750 | 4.1 | 26.6 |
| 750–1,000 | 1.7 | 35.0 |
| >1,000 | | 14.0 |

We claim:
1. Process for the production of a molding powder consisting essentially of a polyolefin and a fine powder form solid blow agent, which comprises mixing a polyolefine powder, in a grain size distribution wherein up to 85% by weight of the particles are less than 150$\mu$, with from 0.1 to 5% by weight of a solid fine powder form blowing agent having a grain size not greater than 50$\mu$, simultaneously stirring and heating the mixture up to its sintering temperature in a high speed mixer until there is a sharp increase in the electric current supply to the driving motor, continuing the high speed stirring for up to 5 minutes at the attained temperature; and then cooling the resultant foamable mixture in powder form.

2. The process defined in claim 1, in which not more than 80% by weight of the polyolefin particles are less than 150$\mu$ in size.

3. The process defined in claim 1, in which the maximum size of the polyolefin particles is 1000$\mu$.

4. The process defined in claim 1, in which the polyolefin powder is derived from a member of the group consisting of ethylene, propylene, butene-1 and mixtures of the same, and in which the blowing agent is a member of the group consisting of azodicarbonamide, diphenyloxide-4,4'-disulfohydrazoate and a carbonate-acid mixture which liberates carbon dioxide.

References Cited
UNITED STATES PATENTS

| | | |
|---|---|---|
| 2,945,827 | 7/1960 | Henning. |
| 2,945,828 | 7/1960 | Henning. |
| 3,017,371 | 1/1962 | Hohenberg et al. |
| 3,278,329 | 10/1966 | Wiczer. |
| 2,676,929 | 4/1954 | Duddy _____ 260—2.5 |

SAMUEL H. BLECH, Primary Examiner

W. J. BRIGGS, Sr., Assistant Examiner

U.S. Cl. X.R.

117—100